(12) United States Patent
Denovich et al.

(10) Patent No.: US 7,123,808 B2
(45) Date of Patent: Oct. 17, 2006

(54) CABLE MANAGEMENT SYSTEM

(75) Inventors: Sam Denovich, Harrisburg, PA (US); Bruce Eltringham Barry, Middletown, PA (US); James Joseph Eberle, Jr., Hummelstown, PA (US); John Carey Hoffer, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/993,376

(22) Filed: Nov. 19, 2004

(65) Prior Publication Data

US 2006/0110117 A1  May 25, 2006

(51) Int. Cl.
*G02B 6/00* (2006.01)
(52) U.S. Cl. .................................. 385/135; 385/134
(58) Field of Classification Search ................ 385/135; 439/719

See application file for complete search history.

(56) References Cited

U.S. PATENT DOCUMENTS

| | | | |
|---|---|---|---|
| 4,898,448 A * | 2/1990 | Cooper ...................... 385/92 |
| 5,100,221 A * | 3/1992 | Carney et al. .............. 385/135 |
| 5,142,606 A * | 8/1992 | Carney et al. .............. 385/134 |
| 5,231,687 A * | 7/1993 | Handley ..................... 385/139 |
| 5,297,229 A * | 3/1994 | Shimada et al. ............ 385/135 |
| 5,937,130 A * | 8/1999 | Amberg et al. ............. 385/134 |
| 6,044,193 A * | 3/2000 | Szentesi et al. ............ 385/134 |
| 6,164,369 A * | 12/2000 | Stoller .................... 165/104.33 |
| 6,424,781 B1 * | 7/2002 | Puetz et al. ................ 385/135 |
| 6,535,682 B1 * | 3/2003 | Puetz et al. ................ 385/135 |
| 6,541,705 B1 * | 4/2003 | McGrath ................... 174/99 R |
| 6,584,267 B1 * | 6/2003 | Caveney et al. ........... 385/134 |
| 6,920,273 B1 * | 7/2005 | Knudsen .................... 385/135 |
| 2003/0185536 A1 * | 10/2003 | Steinman et al. .......... 385/134 |
| 2003/0223724 A1 * | 12/2003 | Puetz et al. ................ 385/135 |
| 2004/0011750 A1 * | 1/2004 | Kim et al. .................... 211/26 |
| 2004/0175088 A1 * | 9/2004 | Dagley et al. ............. 385/135 |
| 2004/0175089 A1 * | 9/2004 | Dagley et al. ............. 385/135 |

* cited by examiner

*Primary Examiner*—Kaveh Kianni
*Assistant Examiner*—Ryan Lepisto (57) ABSTRACT

A cable management system includes an equipment system, and at least one patch panel having a connectivity interface. The connectivity interface is configured to connect with at least one cable extending from the equipment system. The cable management system also includes a manifold configured to be located between the equipment system and the patch panel. The manifold includes an inlet and an outlet, and the manifold is configured to direct the at least one cable from the equipment system to the connectivity interface.

18 Claims, 5 Drawing Sheets

CABLE MANAGEMENT SYSTEM

BACKGROUND OF THE INVENTION

The present invention generally relates to a cable management system for interconnecting electronics or fiber optic cables and more specifically to a cable management system for connecting an equipment system to multiple patch panels.

Numerous cable management systems exist today and are used in various electronics equipment applications, such as telecommunications, data transmission, networking, video and the like. Typically, to install a cable management system, a frame is securely mounted to the floor within the room in which the system is to be maintained. Multiple patch panels or boxes are then secured to the frame in a stacked arrangement. Each patch panel includes multiple connector ports (e.g. RJ45 connector ports) along the front face thereof. Each connector port is adapted to receive a plug on a mating cable that conveys a single data stream, such as for an individual user and the like, or multiple data streams.

Additionally, each patch panel includes connector modules electrically coupled to the connector ports and configured to receive a mating cable from an equipment panels by a trunk cable. At the switching network, the trunk cables are connected to switch blades located within a switching network housing. In known cable management systems, the trunk cables extend to either side of the switching network housing and are then brought up either side of the frame before being connected to the corresponding patch panels. In doing so, the trunk cables do not interfere with the front face of the patch panels where the mating cables interface with the connector ports of the patch panels, but the trunk cables do increase the overall footprint of the system. Additionally, as the number of cables increases, heretofore, wire managers have been widened laterally relative to the patch panels or constructed deeper (i.e. in the direction transverse to the front face of the patch panels) thereby increasing the overall footprint of the system.

One problem associated with these known systems is that cable management systems are reaching the size limits afforded by certain standards and/or by physical constraints of rooms and environments in which they are mounted. Specifically, as the capacity of the cable management system increases, the number of individual cables similarly increases, and the cable mass is becoming prohibitive.

In at least some other known cable management systems, the trunk cables extend over the top of the frame prior to being connected to the corresponding patch panel. A problem associated with these known systems is that the routing of the trunk cables around the sides, and over the top of the frame leads to a larger cable mass. A larger cable mass causes additional heat and limits the amount of open space for the movement of air, thus decreasing the efficiency of the cable management system. Yet another problem associated with these known systems is that the trunk cables tend to interfere with the fans provided to cool the switching network. As such, the switching network may be subject to overheating.

A need remains for an improved cable management system having a more space efficient geometry.

BRIEF DESCRIPTION OF THE INVENTION

In an exemplary embodiment of the present invention, a cable management system is provided. The cable management system includes an equipment system, and at least one patch panel having a connectivity interface. The connectivity interface is configured to connect with at least one cable extending from the equipment system. The cable management system also includes a manifold configured to be located between the equipment system and the patch panel. The manifold includes an inlet and an outlet, and the manifold is configured to direct the at least one cable from the equipment system to the connectivity interface.

Certain embodiments of the present invention may also include a manifold having a front wall, side walls, a back wall, and a top wall, wherein the inlet is oriented within the front wall, and the outlet is oriented within at least one of the top wall and the back wall. Optionally, the cable management system may include a frame, wherein the patch panel, the equipment system, and the manifold are secured to the frame.

Certain embodiments of the present invention may also include a patch panel having a front face including a plurality of connector modules oriented on an opposing side of the patch panel as the connectivity interface. Additionally, the manifold includes a front wall including the inlet, and the equipment system includes a front wall that is substantially aligned with the front face of the patch panel. Optionally, the cable may extend from the front wall of the equipment system, through the inlet, and is connected to the connectivity interface of the patch panel.

Certain embodiments of the present invention may also include a thermal management system for cooling at least one of the equipment system, the cable, and the patch panel. Optionally, the thermal management system includes a louvered cover having at least one vent for channeling airflow therethrough, and at least one fan coupled to the louvered cover for generating the airflow through the vent. Optionally, the thermal management system includes a duct in flow communication with the fan. In one embodiment, the duct may be coupled to the manifold for generating airflow through said manifold. Alternatively, the duct may be positioned within a gap between the manifold and the equipment system such that the duct is configured to generate airflow along a surface of the equipment system and a surface of the manifold.

DETAILED DESCRIPTION OF THE INVENTION

Figure 1:
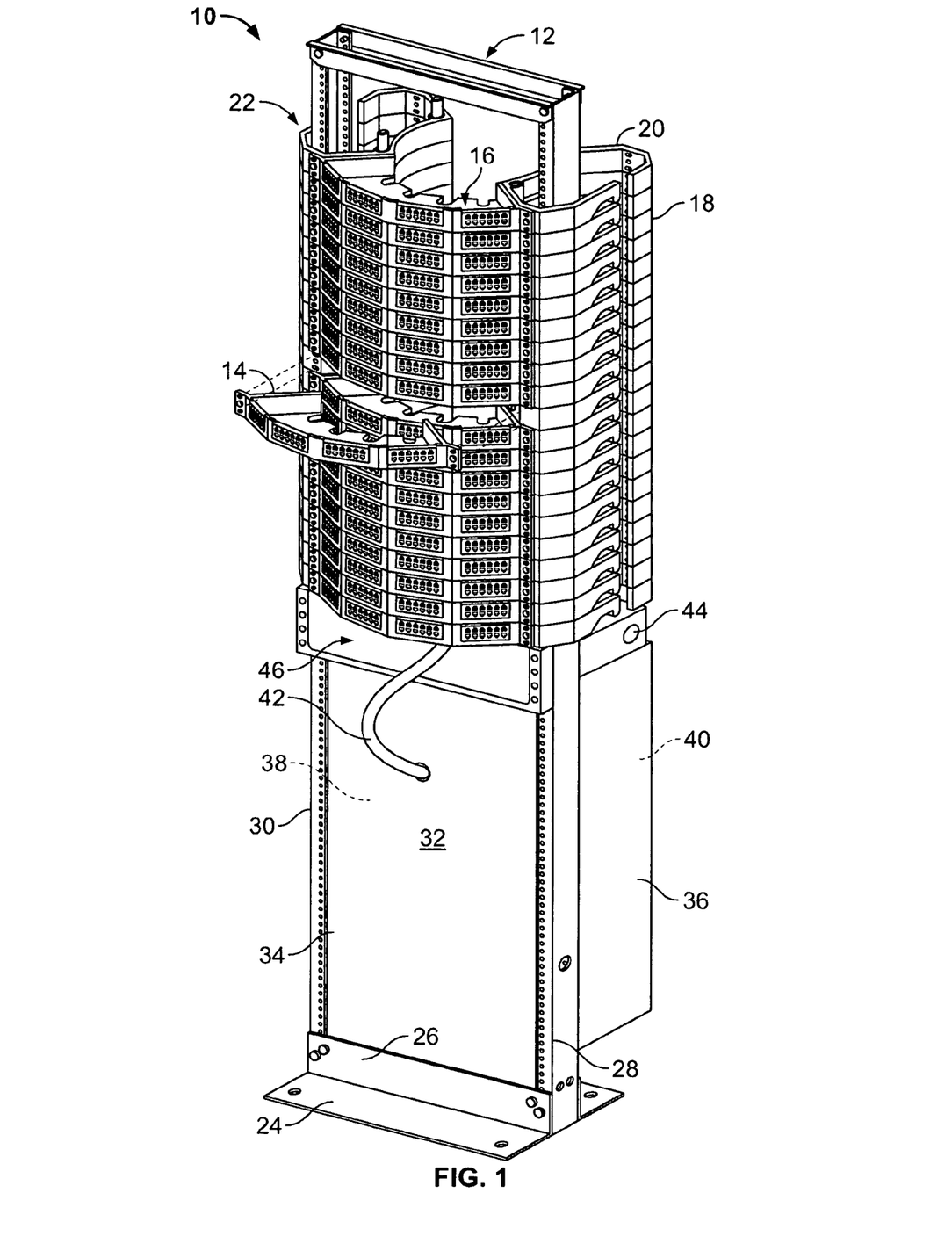
FIG. 1 illustrates an isometric view of a cable management system formed in accordance with an embodiment of the present invention.

FIG. 1 illustrates a cable management system 10 formed in accordance with an embodiment of the present invention. The cable management system 10 includes a frame 12 that is configured to be mounted to the floor and/or ceiling of an applications room. A plurality of patch panels 14 are arranged in a manner stacked upon one another forming a distribution assembly 16. The patch panels 14 are securely attached to the frame 12. A plurality of wire managers 18 are also stacked upon one another and arranged in first and second groups on opposite sides of the patch panels 14 forming wire manager modules 20 and 22. The patch panels 14 and wire managers 18 are arranged in a non-orthogonal relationship to one another. The term "non-orthogonal", as used throughout, shall include any non-parallel or non-perpendicular angle or geometry. The frame 12 extends upward through each of the wire managers 18 and is securely attached to each wire manager 18 and to each patch panel 14. The frame 12 includes a base plate 24 having an upper flange 26 that is joined to support brackets 28 and 30.

An equipment system 32 (such as a switching network) is also shown in FIG. 1, although the system 32 may be entirely removed or may be located in a different location. The system 32 includes a front wall 34, opposing side walls 36 and 38, and a rear wall 40. Optionally, the side walls 36 and 38 may be securely attached to the support brackets 28 and 30, respectively, directly below the distribution assembly 16. A plurality of multiport cables 42 extend from the front wall 34 and are configured to be electrically coupled to the patch panels 14 in a manner explained below in more detail. In one embodiment, the system 32 may include approximately 160 multiport cables 42.

A cable guide manifold 44 is also shown in FIG. 1. The manifold 44 is adapted to direct the multiport cables 42 extending from the equipment system 32 to the patch panels 14. Specifically, the manifold 44 includes an inlet 46 through which the multiport cables 42 extend. In one embodiment, the manifold 44 is box-shaped, however, is not intended to be limited thereto. For example, the manifold 44 may be tubular-shaped and may include a bend therein such that the manifold 44 transitions the cables 42 towards the patch panels 14. Optionally, the manifold 44 may be triangular-shaped having a wider portion at the inlet 46 and a narrower portion opposite the inlet 46 for directing the cables 42 towards the patch panels 14.

In one embodiment, the manifold 44 is positioned between the system 32 and the distribution assembly 16. Optionally, the manifold 44 may be positioned adjacent the system 32 or the patch panels 14. Alternatively, the manifold 44 may be positioned a distance from the system 32 or the patch panels 14. In one embodiment, the manifold 44 is securely attached to the support brackets 28 and 30. Alternatively, the manifold 44 may be moveable along the support brackets 28 and 30 between the system 32 and the patch panels 14 to direct and/or position the cables 42. In another alternative embodiment, additional manifolds may be provided to direct additional wires, such as, for example, the wires collected by the wire managers 18.

Figure 2:
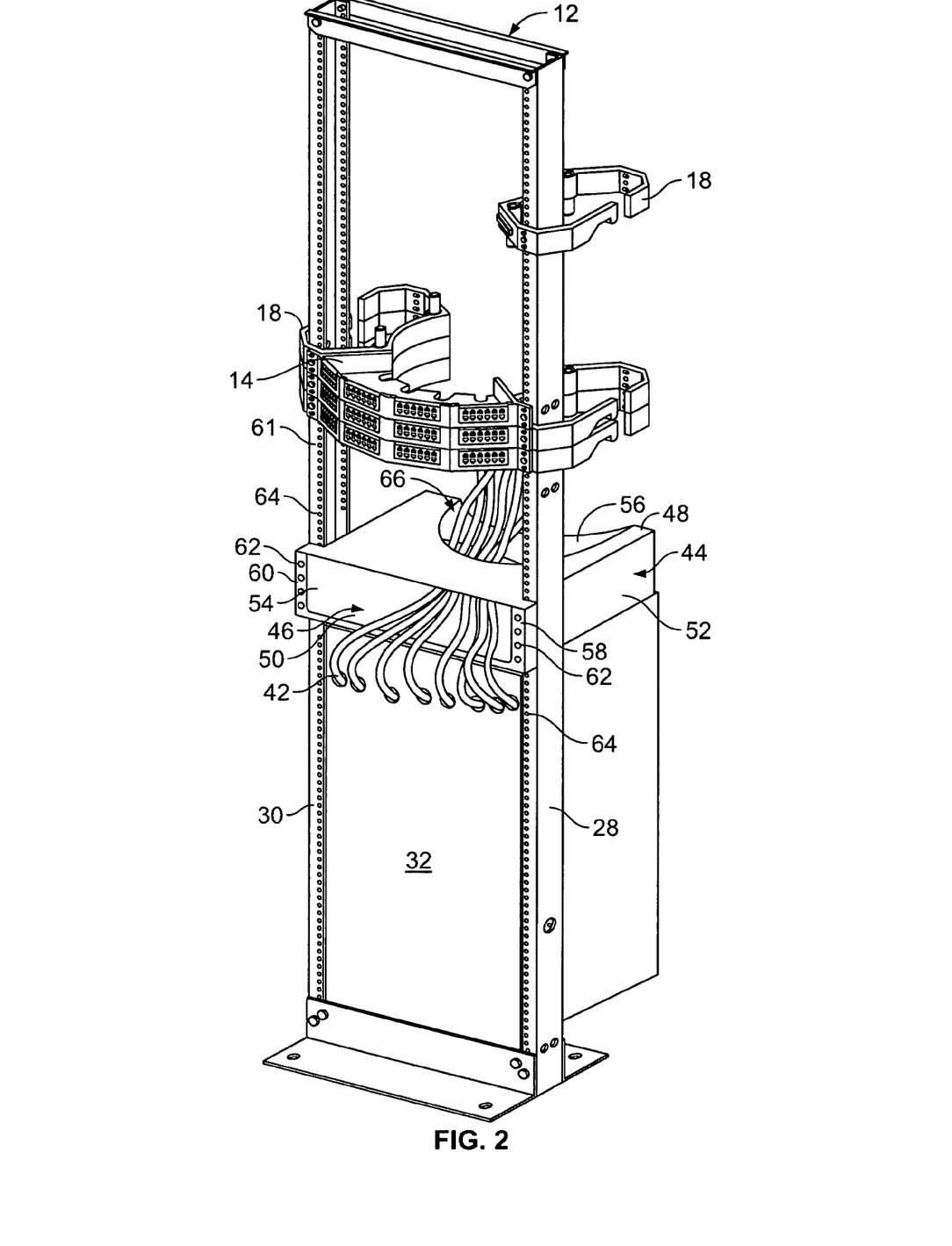
FIG. 2 illustrates an isometric view of the cable management system of FIG. 1 with several patch panels and wire managers removed.

FIG. 2 illustrates the manifold 44 securely attached to the frame 12. Additionally, a plurality of patch panel 14 and corresponding wire managers 18 are securely attached to the frame 12. In the exemplary embodiment, the manifold 44 is box-shaped and includes a top wall 48, a bottom wall 50, side walls 52 and 54, and a back wall 56. The manifold 44 has a complimentary size to the overall footprint of the system 32. As such, the manifold 44 does not occupy more space than the system, and in one exemplary embodiment, the manifold 44 is not wider than the frame 12.

The inlet 46 is positioned at the front of the manifold 44 and extends between the sidewalls 52 and 54. In an alternative embodiment, the inlet may be positioned in the sidewalls 52 and 54. In one embodiment, the inlet 46 has a rectangular shape corresponding to the shape of the manifold 44. As such, the inlet 46 is as wide and tall as the manifold 44, allowing an increased area through which the cables 42 may enter the manifold 44. Alternatively, a front wall (not shown) may be provided that defines the inlet 46. As such, the inlet 46 is an opening in the front wall having a predetermined shape, such as a circular shape, an oval shape, or a rectangular shape. Optionally, a protective liner (not shown) may extend along the inlet 46 to protect the cables 42 from wear.

In one embodiment, bracket mounts 58 and 60 extend from the side walls 52 and 54, respectively, at the front of manifold 44. The bracket mounts 58 and 60 permit the manifold 44 to be loaded onto the corresponding support brackets 28 or 30. In one embodiment, the bracket mounts 58 and 60 abut a front facing surface 61 of the support brackets 28 and 30, respectively. Alternatively, the bracket mounts 58 and 60 include a hook end (not shown) that extends around the corresponding support brackets 28 or 30 to resist horizontal movement of manifold 44 away from the support brackets 28 and 30. Once each bracket mount 58 and 60 is positioned along the corresponding support bracket 28 and 30, the manifold 44 is secured to the support bracket 28 and 30 through any of several conventional fastening means, such as bolts, screws, welding, adhesive, hooks and the like. In the exemplary embodiment of FIG. 2, a series of holes 62 are provided though each bracket mount 58 and 60 which align with holes 64 in the corresponding support bracket 28 or 30. Pins or bolts are inserted through the holes 62 and 64 to achieve a secure connection.

An outlet 66 extends through the top wall 48 and the back wall 56 of the manifold 44 for allowing access for the cables 42 to the patch panels 14. Optionally, the outlet 66 may only extend through one of the top wall 48 or the back wall 56. In one embodiment, the outlet 66 has a curvilinear shape, such that the outlet 66 is wider in the middle of the manifold top wall 48 as compared to the width near the manifold side walls 52 and 54. Accordingly, the mass of cables 42 are directed away from the side walls 52 and 54 at the outlet 66. In one embodiment, the shape of the outlet may correspond to the shape of the patch panels 14 such as for example, the arcuate shape illustrated in FIG. 2. In an alternative embodiment, the outlet 66 may have a rectangular shape such that the outlet 66 extends across the top wall 48 to the side walls 52 and 54. Optionally, the outlet 66 may extend only partially between the side walls 52 and 54. Additionally, as indicated above, the outlet 66 may extend through the back wall 56 of the manifold 44, which may be necessitated by the amount of cables 42 extending through the manifold 44. The shape of the outlet in the back wall 56 may be either linear or curvilinear.

The outlet 66 directs the multiport cables 42 to the rear side of the patch panels 14. As such, the multiport cables 42 extend along a common plane that extends from the front to the rear of the cable management system 10. Additionally, by directing the multiport cables 42 from the front of the equipment system 32 to the rear of the patch panels 14, the multiport cables 42 are directed away from the sides of the cable management system 10. Accordingly, the multiport cables 42 do not interfere with the cabling that may be connected to the front of the patch panels 14 and directed along the sides of the cable management system 10 by the wire managers 18.

Figure 3:
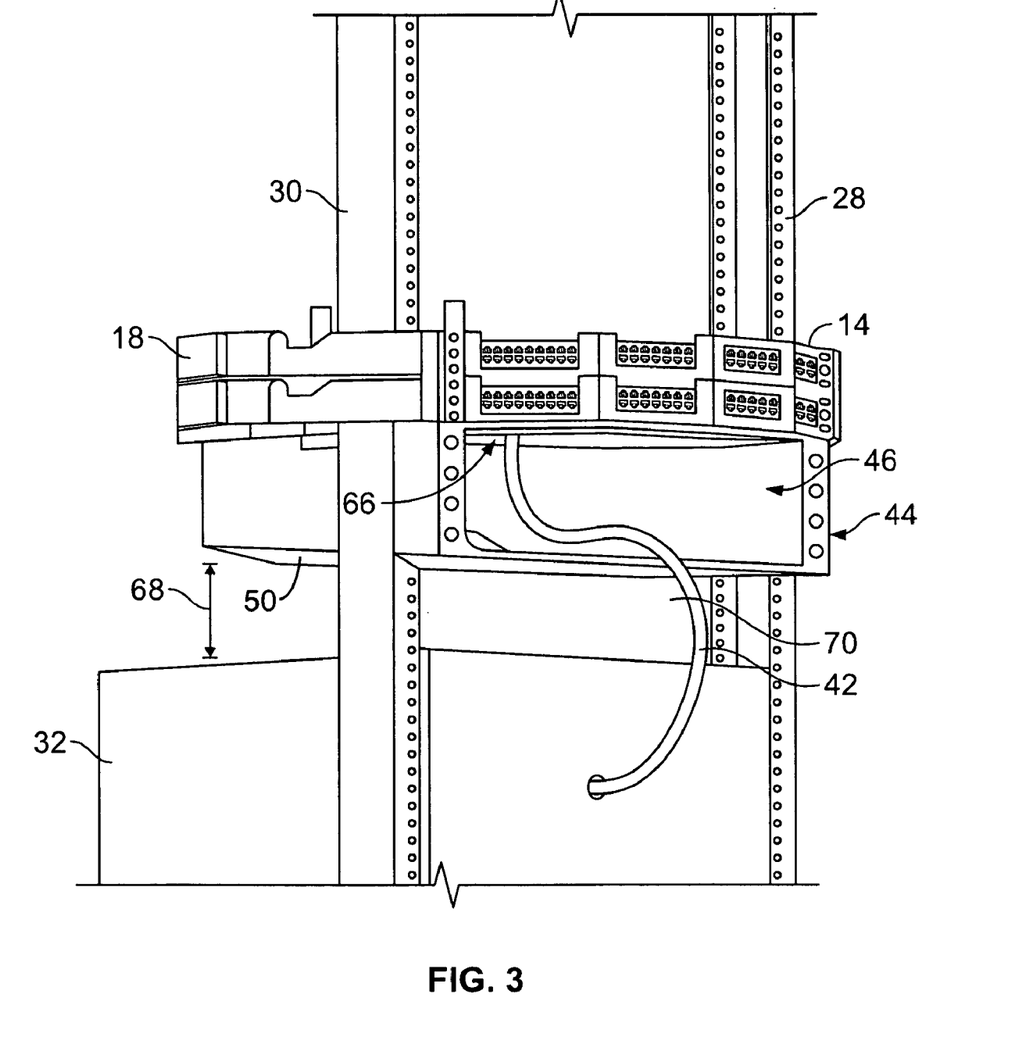
FIG. 3 illustrates an isometric view of a manifold formed in accordance with an embodiment of the present invention.

FIG. 3 illustrates the manifold 44 in position relative to the equipment system 32 and the patch panel 14. The manifold 44 is positioned a distance 68 above the equipment system 32 such that a gap 70 is formed therebetween. The gap 70 provides additional space to allow cooling air to pass between the equipment system 32 and the manifold 44.

Optionally, the gap 70 allows the multiport cables 42 to transition from an outward-and-upward orientation to an inward-and-upward orientation such that the multiport cables 42 can pass through the inlet 46 and outlet 66 of the manifold 44. Optionally, the manifold 44 may be positioned directly above the equipment system 32 such that the gap 70 is not formed therebetween. In one embodiment, the bottom wall 50 may be upwardly sloped to direct the cables 42 into the outlet 66.

Figure 4:
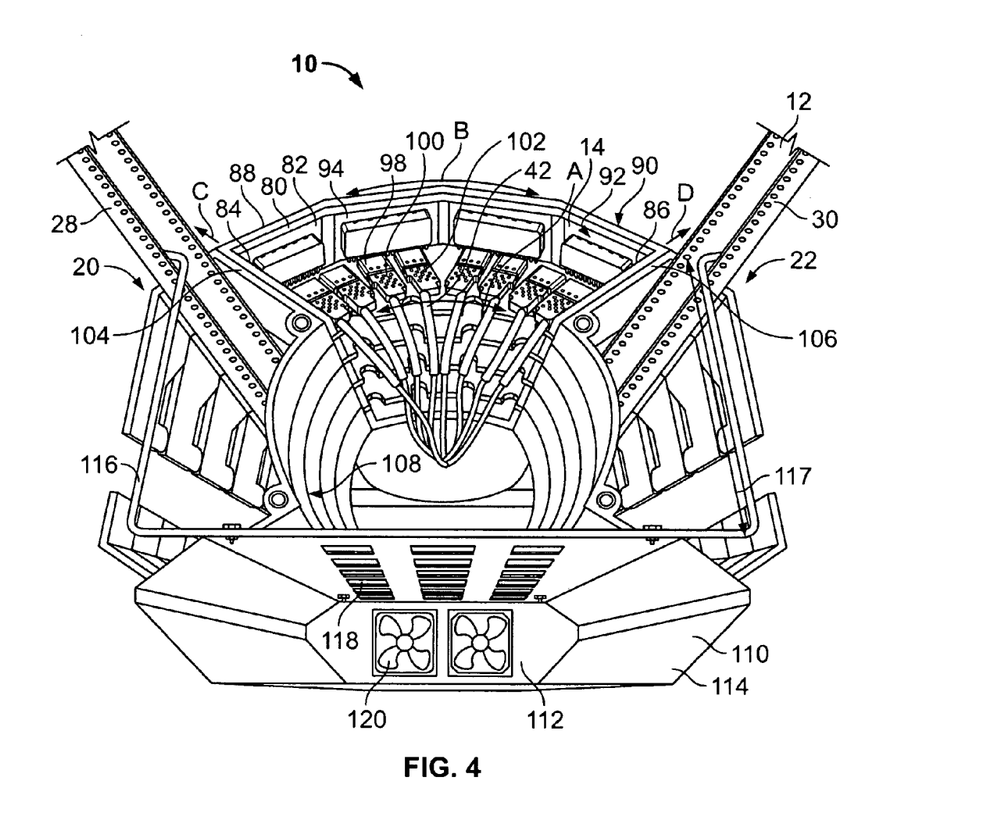
FIG. 4 illustrates a top isometric view of a cable management system formed in accordance with an alternative embodiment of the present invention.

FIG. 4 illustrates a top view of the cable management system 10. The wire manager modules 20 and 22 are mounted to the frame 12 on opposite sides of patch panels 14 to form a C-shaped geometry. Optionally, the frame 12 may be entirely removed and the patch panels 14 and wire manager modules 20 and 22 joined as shown to be free standing independent of and without any need for the frame 12. The C-shaped geometry formed by the wire manager modules 20 and 22 and patch panels 14 affords a very stable footprint that may not necessarily need any additional supporting structure. The patch panels 14 and wire manager modules 20 and 22 extend along common interior and exterior circular arcs as denoted by arrows A and B, respectively.

Optionally, the patch panels 14 and wire managers 16 may be constructed in other non-orthogonal geometries other than a C-shape. For example, the non-orthogonal geometry may resemble other cylindrical shapes, such as a complete circle, a complete or partial oval, a complete or partial polygon, and the like.

In one embodiment, the patch panel 14 includes a body 80 having a base 82, side walls 84 and 86 and a front face 88. The patch panel 14 generally includes front and rear connectivity interfaces 90 and 92, respectively. The front connectivity interface 90 includes multiple connector modules (not shown) configured to interface with connectors (not shown), such as, for example, RJ-45 connectors, optical connectors, power connectors and the like. However, many other types of connectors may be substituted and utilized.

The patch panel 14 may include one or more circuit boards 94 mounted on the base 82. The circuit board 94 is generally semi-circular in shape to follow the curvature of the base 82. The circuit board 94 includes conductive signal paths provided thereon, such as traces or in a lead frame. The traces interconnect individual contacts within each connector module with a corresponding multiport connector 98 which is mounted on the circuit board 94. The patch panel 14 includes multiple multiport connectors 98 mounted on the circuit board 94. The multiport connectors 98 each include a receptacle 100 which is configured to receive a multiport plug 102 extending from an end of a corresponding multiport cable 42. The multiport cables 42 convey multiple independent data streams. The individual data streams from the connector modules are not merged with one another, but instead are grouped at receptacle 100 for a single plug 102 and cable 42 configured to convey multiple independent data streams. Examples of the receptacle 100 are RJ-21, D-Subminiature, MPO, SCSI connectors and the like. The multiport connectors 98 define the rear connectivity interface 92. Alternately, a wire or optical fiber may be directly terminated to the rear face of the connector modules through means of crimping, soldering, adhesives, insulation displacement termination, splicing, connectorization and the like.

The patch panels 14 join with each of the wire manager modules 20 and 22 at respective abutting side walls 84 and 86 on the patch panels 14, and 104 and 106 on the wire managers 18. The side walls 84 and 86 of the patch panels 14 and the side walls 104 and 106 of the wire managers 18 are oriented to abut against one another along radial axes, generally denoted by arrows C and D, which extend outward from a central cavity 108 of the cable management system 10. Additionally, the side walls of the patch panels 14 direct the multiport cables 42 towards the central cavity 108 of the cable management system 10 where the cables 42 are grouped and directed as a single cable mass. Specifically, the cables 42 extend downward through the cable management system 10 to the manifold 44. The cables 42 are directed through the manifold outlet 66, through the manifold 44, and through the manifold inlet 46 (FIG. 1), where the cables 42 are connected to the front face 34 of the equipment system 32 (FIG. 1).

In one embodiment, the cable management system 10 includes a louvered cover 110. The cover 110 includes a base 112 and a side wall 114. In one embodiment, the cover 110 is positioned adjacent the central cavity 108. Specifically, the cover 110 extends parallel to the patch panels 14 along the rear portion of the patch panels 14 such that the cover is configured to provide cooling airflow to each of the patch panels 14 in the cable management system 10. The cover 110 is coupled to the brackets 28 and 30 by bracket supports 116. In one embodiment the bracket supports 116 are fabricated from a rigid material, such as metal or plastic, and extend from either side of the cover 110 to the brackets 28 and 30. The supports 116 extend a predetermined length 117 from the brackets 28 and 30 such that the cover does not interfere with the central cavity 108, and with the cables 42 positioned within the central cavity 108. In one embodiment, the supports 116 have a length 117 such that the cover 110 abuts the wire managers 18.

A multitude of vents 118 extend through a portion of the side wall 114. In one embodiment, the vents 118 are oriented on the portion of the side wall 114 that abuts the central cavity 108. The vents 118 pass airflow through the central cavity 108 of the cable management system 10. In one embodiment, the vents 118 direct airflow from the cover 110 into the central cavity 108. In another embodiment, the vents 118 direct airflow from the central cavity 108 into the cover 110.

A plurality of fans 120 are coupled to the base 112 of the cover 110. Alternatively, the fans 120 may be coupled to a top portion of the louvered cover 110. In another alternative embodiment, the fans may be coupled along the side wall 114. The fans 120 direct cooling airflow into the central cavity 108 to cool the electrical components therein, such as, for example, the cables 42, the multiport connectors 98, and the circuit boards 94. As such, the fans 120 channel airflow into the louvered cover 110, through the vents 118, and into the central cavity 108. Alternatively, the fans 120 may be configured to extract the hot air from the central cavity 108 in order to lower the temperature of the components therein. As such, the fans 120 pull airflow out of the louvered cover 110, wherein airflow is also pulled out of the central cavity 108 via the vents 118. Accordingly, the louvered cover 110 provides a cooling circuit for the components of the cable management system 10. Additionally, by being positioned adjacent the central cavity 108, the components do not interfere with the flow path of the cooling airflow, rather, the airflow is directed around the components, thereby cooling the components. In alternative embodiments, other thermal management devices may be utilized to cool the electrical components within the cable management system, such as, for example, fluid filled radiators.

Figure 5:
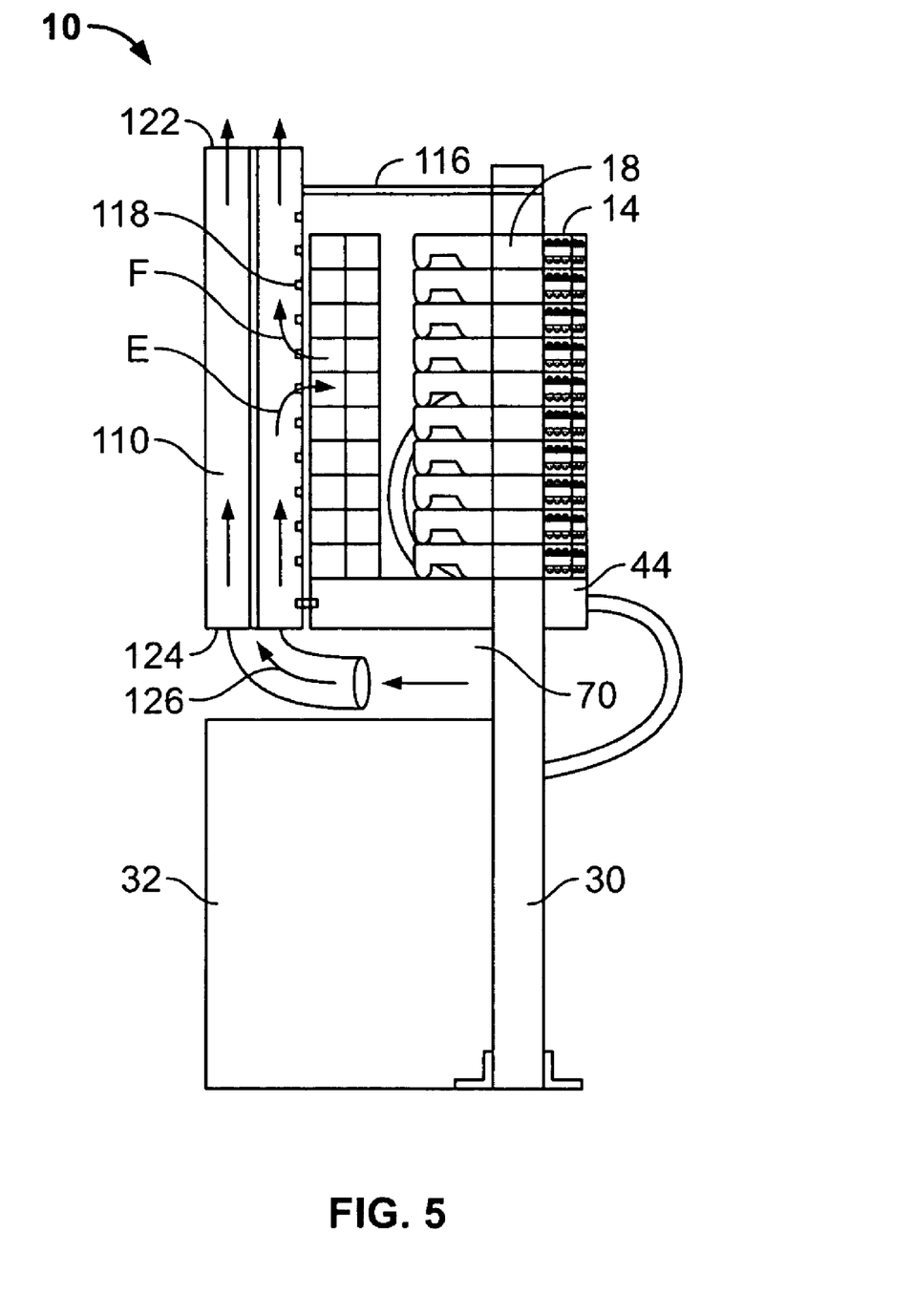
FIG. 5 illustrates a side view of the cable management system shown in FIG. 4.

FIG. 5 illustrates a side view of the cable management system 10. The patch panels 14, the wire managers 18, and the manifold 44 are each coupled to the bracket 30 as indicated above. In one embodiment, the manifold 44 is coupled to the bracket 30 such that the gap 70 is formed between the manifold 44 and the equipment system 32. The louvered cover 110 is coupled to the bracket 30 via the bracket support 116 at a top end 122 of the cover 110. Additionally, the louvered cover 110 is coupled to the manifold 44 at a bottom end 124 of the cover 110 for additional support. Alternatively, the louvered cover 110 may be coupled to the bracket 30 by multiple bracket supports along the cover 110. In another alternative embodiment, the cover 110 may extend below the manifold 44 such that the cover 110 provides cooling airflow to the equipment system 32.

A duct 126 extends from the bottom end 124 of the louvered cover 110. In one embodiment, a plurality of ducts 126 extend from the bottom end 124, and are in flow communication with corresponding fans 120 (FIG. 4). The duct 126 is positioned between the manifold 44 and the equipment system 32 as an air intake for supplying cooling airflow through the louvered cover 110 and the central cavity 108. Alternatively, the duct 126 may function as an exhaust for the fans 120. Additionally, the duct 126 passes airflow along the manifold 44 and the system 32 for cooling the manifold 44 and the system 32.

In an alternative embodiment, the manifold 44 is positioned directly above the system 32 such that the gap 70 is not included. Optionally, the duct 126 may be coupled directly to the manifold 44. As such, the airflow passing through the manifold 44 into the duct 126 cools the multiport cables 42 extending through the manifold 44.

In operation, the airflow channeled through the louvered cover 110 may be directed into the central cavity 108, as indicated by arrow E, or may be extracted from the central cavity 108, as indicated by arrow F. The airflow is directed into, or out of, the central cavity 108 via the vents 118. Excess airflow is directed through the top end 122 of the cover 110.

The above-described cable management system 10 provides a cost effective and reliable means for assembling multiport cables 42. Specifically, the cable management system 10 includes a manifold 44 that can be coupled to a frame between an equipment system 32 and the corresponding patch panels 14. The cables 42 are directed into an inlet 46 of the manifold 44 and out through an outlet 66 of the manifold 44. Accordingly, the cables 42 are directed directly from the front of the equipment system 32 to the back of the patch panels 14. Accordingly, the amount of cable mass and the complexity of the cable routing is reduced. Additionally, due to the increased heat associated with such cable management systems 10, a thermal management system including a louvered cover 110 and a plurality of fans 120 are coupled in flow communication with the central cavity 108 of the cable management system 10. As such, the components of the system 10 are cooled.

Exemplary embodiments of cable management systems 10 are described above in detail. The systems 10 are not limited to the specific embodiments described herein, but rather, components of each system 10 may be utilized independently and separately from other components described herein. For example, each system 10 component can also be used in combination with other system 10 components.

While the invention has been described in terms of various specific embodiments, those skilled in the art will recognize that the invention can be practiced with modification within the spirit and scope of the claims.

What is claimed is:

1. A cable management system comprising:
an equipment system having a front face;
a patch panel comprising a front connectivity interface and a rear connectivity interface, said patch panel defining a central cavity facing said rear connectivity interface, said rear connectivity interface configured to connect with at least one cable extending from the equipment system; and
a manifold configured to be located between said equipment system and said patch panel, said manifold comprising a front wall having an inlet and a top wall having an outlet, wherein said outlet is located directly below and opens upward toward said central cavity, wherein said inlet is located below the front connectivity interface and opens onto the front face of said equipment system, said manifold configured to direct the at least one cable from said inlet to said outlet.

2. The cable management system of claim 1, wherein said patch panel includes walls extending from a front face of said patch panel to a rear end of said patch panel, said walls are inwardly tapered and are configured to direct the at least one cable into said cavity defined by said patch panel.

3. The cable management system of claim 1, wherein said manifold further comprises side walls, a back wall, and a closed bottom wall, said manifold having one of a box-shape and a tubular shape.

4. The cable management system of claim 3, said central cavity being substantially aligned above said outlet in said top wall of said manifold, said patch panel surrounding multiple sides of said cable cavity.

5. The cable management system of claim 4, wherein said rear connectivity interface directly accesses said cable cavity.

6. The cable management system of claim 1, further comprising a frame, said patch panel and said manifold secured to said frame.

7. The cable management system of claim 1, wherein said front wall is substantially aligned with said front face.

8. The cable management system of claim 1, wherein said at least one cable extends from said front face of said equipment system, said at least one cable extends through said inlet, and said at least one cable is connected to said rear connectivity interface of said patch panel.

9. The cable management system of claim 1, further comprising a thermal management system for cooling at least one of the equipment system, said at least one cable, and said patch panel.

10. The cable management system of claim 1, further comprising a louvered cover comprising at least one vent for channeling airflow therethrough, and at least one fan coupled to said louvered cover for generating said airflow through said vent.

11. The cable management system of claim 1, further comprising a louvered cover, a fan coupled to said louvered cover for generating airflow through said cover, and a duct in flow communication with said fan.

12. The cable management system of claim 11, wherein said duct is coupled to said manifold for generating airflow through said manifold.

13. The cable management system of claim 1, wherein said manifold is positioned in contact with a top surface of said equipment system.

14. The cable management system of claim 1, wherein said manifold comprises:

a front wall configured to be located proximate a front face of said equipment system, said inlet provided in said front wall;
side walls joined to said front wall;
a back wall extending between said side walls;
a bottom wall joined to each of said front, back and side walls, said bottom wall positioned proximate said equipment system; and
a top wall joined to each of said front, back and side walls, said top wall positioned proximate said patch panel, said outlet provided in said top wall.

15. The cable management system of claim 1, wherein said manifold has a bottom wall that is upwardly sloped toward said outlet to direct the at least one cable to said outlet in said top wall.

16. The cable management system of claim 1, wherein said manifold further comprises a back wall, said outlet provided within both of said back wall and said top wall.

17. The cable management system of claim 1, wherein said manifold is box-shaped and comprises a transition portion between said inlet and said outlet wherein the at least one cable extends in a first direction as the at least one cable extends through the inlet, and the at least one cable extends in a second direction as the at least one cable extends through the outlet, wherein the direction is changed in said transition portion of said manifold.

18. A cable management system comprising:
an equipment system;
a patch panel comprising a front connectivity interface and a rear connectivity interface, said rear connectivity interface configured to connect with a cable extending from the equipment system;
a manifold located between said equipment system and said patch panel such that a gap is defined between said equipment system and said manifold, said manifold comprising an inlet and an outlet, said manifold configured to direct at least one cable from said equipment system to said rear connectivity interface;
a louvered cover;
a fan coupled to said louvered cover for generating airflow through said cover; and
a duct in flow communication with said fan, said duct positioned at least partially within said gap such that said duct is configured to generate airflow along a surface of said equipment system and a surface of said manifold.

* * * * *